United States Patent
Singh et al.

(10) Patent No.: US 9,055,482 B1
(45) Date of Patent: Jun. 9, 2015

(54) WIRELESS FREQUENCY CHANGES FOR WIRELESS COMMUNICATION DEVICES BASED ON TRACKING AREA UPDATES

(75) Inventors: Jasinder Pal Singh, Olathe, KS (US); Sachin R. Vargantwar, Macon, GA (US); Deveshkumar Narendrapratap Rai, Overland Park, KS (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 74 days.

(21) Appl. No.: 13/566,134

(22) Filed: Aug. 3, 2012

(51) Int. Cl.
*H04W 24/02* (2009.01)
*H04W 28/16* (2009.01)

(52) U.S. Cl.
CPC .................................. *H04W 28/16* (2013.01)

(58) Field of Classification Search
CPC ...... H04W 36/00; H04W 72/00; H04W 76/00
USPC ..................... 455/435.2, 436, 452.1; 370/331
See application file for complete search history.

(56) References Cited

U.S. PATENT DOCUMENTS

| 8,000,706 B2 | 8/2011 | Lee et al. |
| 2008/0045262 A1 | 2/2008 | Phan et al. |
| 2008/0254812 A1* | 10/2008 | Kitazoe ..................... 455/456.2 |
| 2010/0144363 A1* | 6/2010 | De Rosa et al. ............ 455/452.1 |
| 2010/0291941 A1 | 11/2010 | Chen et al. |
| 2010/0304747 A1 | 12/2010 | Kazmi et al. |
| 2012/0157100 A1* | 6/2012 | Suzuki et al. ............... 455/435.2 |
| 2013/0034080 A1* | 2/2013 | Yang et al. ..................... 370/331 |
| 2013/0308527 A1* | 11/2013 | Chin et al. .................... 370/328 |

* cited by examiner

*Primary Examiner* — Myron K Wyche

(57) ABSTRACT

Systems, methods, and software for wireless frequency changes for wireless communication devices based on tracking area updates in wireless communication systems are provided herein. In one example, a method of operating a communication system is provided. The method includes providing wireless access to communication services for wireless communication devices over a first frequency spectrum at a wireless access node, and receiving tracking area updates transferred by ones of the wireless communication devices. The method also includes processing at least a quantity of the tracking area updates received at the wireless access node to determine idle timers for the wireless communication devices, where an expiration of an associated idle timer indicates that an associated wireless communication device can no longer receive the wireless access over the first frequency spectrum and can receive further wireless access over a second frequency spectrum.

20 Claims, 3 Drawing Sheets

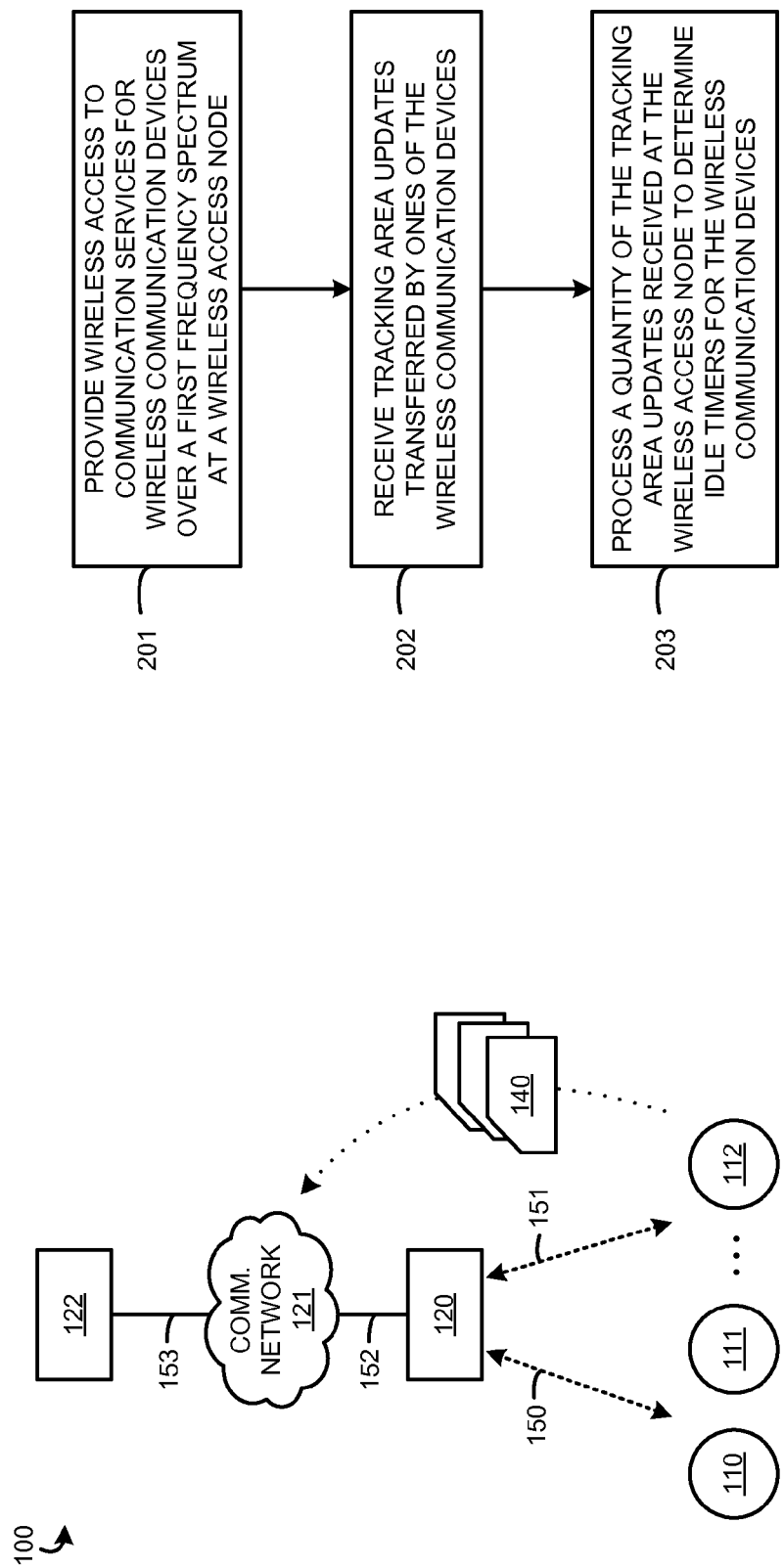

US 9,055,482 B1

WIRELESS FREQUENCY CHANGES FOR WIRELESS COMMUNICATION DEVICES BASED ON TRACKING AREA UPDATES

TECHNICAL FIELD

Aspects of the disclosure are related to the field of communications, and in particular, wireless communication device wireless frequency changes for wireless communication devices in wireless communication networks.

TECHNICAL BACKGROUND

Wireless communication systems typically include wireless access systems, with equipment such as wireless access nodes, which provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices and service providers for the communication services. Communication services typically include voice calls, data exchange, web pages, streaming media, or text messages, among other communication services.

In many wireless communication systems, such as cellular communication systems, many wireless communication devices may simultaneously be receiving wireless access from a particular wireless access node. The wireless access may be provided over more than one wireless frequency spectrum or wireless frequency band. However, if too many wireless communication devices receive wireless access over a particular wireless frequency spectrum, then overloading, slowdowns, and dropped communication sessions can result.

Overview

Systems, methods, and software for wireless frequency changes for wireless communication devices based on tracking area updates in wireless communication systems are provided herein. In one example, a method of operating a communication system is provided. The method includes providing wireless access to communication services for wireless communication devices over a first frequency spectrum at a wireless access node, and receiving tracking area updates transferred by ones of the wireless communication devices. The method also includes processing at least a quantity of the tracking area updates received at the wireless access node to determine idle timers for the wireless communication devices, where an expiration of an associated idle timer indicates that an associated wireless communication device can no longer receive the wireless access over the first frequency spectrum and can receive further wireless access over a second frequency spectrum.

In another example, a communication system is provided. The communication system includes a wireless access node configured to provide wireless access to communication services for wireless communication devices over a first frequency spectrum, and receive tracking area updates transferred by ones of the wireless communication devices. The communication system also includes a processing node configured to process at least a quantity of the tracking area updates received at the wireless access node to determine idle timers for the wireless communication devices, where an expiration of an associated idle timer indicates that an associated wireless communication device can no longer receive the wireless access over the first frequency spectrum and can receive further wireless access over a second frequency spectrum.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 is a system diagram illustrating a communication system.

FIG. 2 is a flow diagram illustrating a method of operation of a communication system.

DETAILED DESCRIPTION

Figure 3:
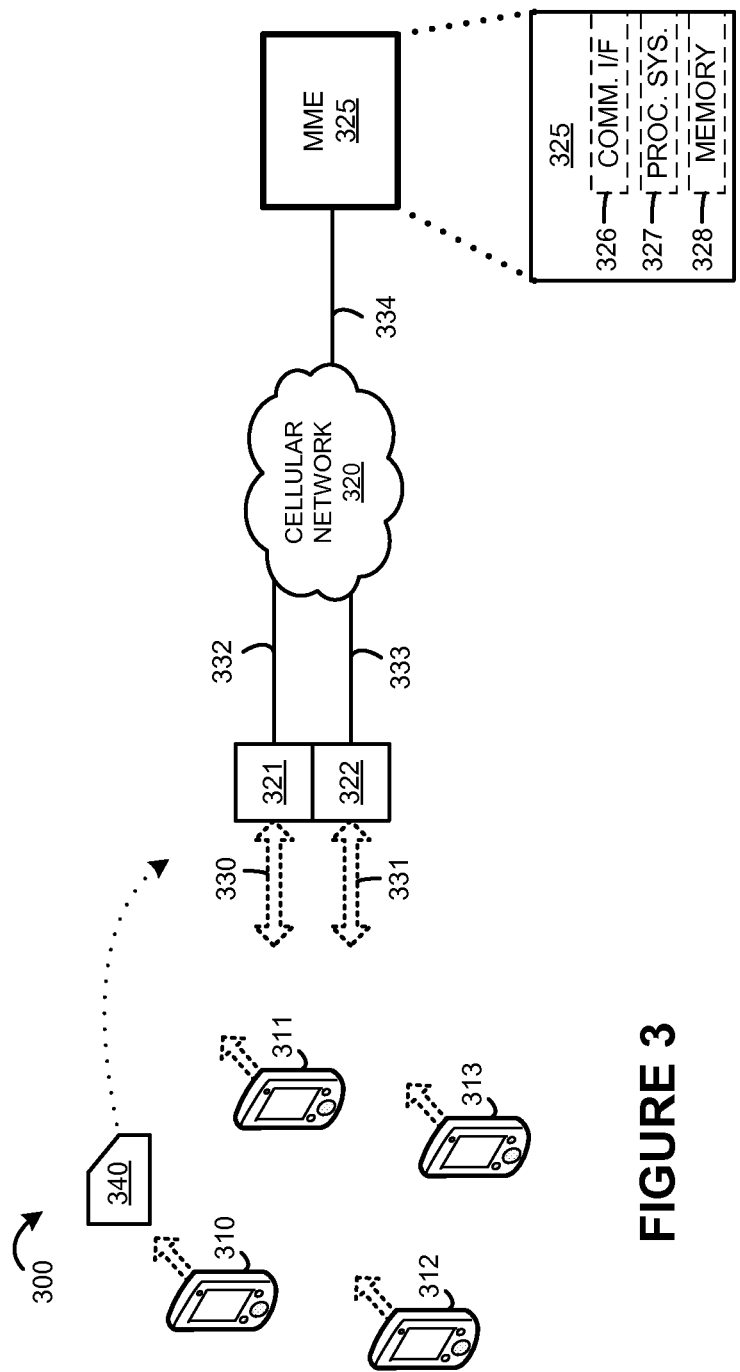
FIG. 3 is a system diagram illustrating a communication system.

FIG. 1 is a system diagram illustrating communication system 100. Communication system 100 includes wireless communication devices 110-112, wireless access node 120, communication network 121, and processing node 122. Wireless communication devices 110-112 can each communicate with wireless access node 120 over any of wireless links 150-151. Wireless access node 120 and communication network 121 communicate over link 152. Processing node 122 and communication network 121 communicate over link 153.

In operation, wireless communication devices 110-112 can receive wireless access to communication services from wireless access node 120. These communication services can include voice calling, text messaging, data transfer, or other communication services. Wireless communication devices 110-112 can each receive the wireless access over any of wireless links 150-151. In this example, wireless link 150 is provided over a first wireless frequency spectrum or frequency band, while wireless link 151 is provided over a second wireless frequency spectrum or frequency band. Also, in this example, ones of wireless communication devices 110-112 can operate over any of the wireless frequency spectrums employed by wireless links 150-151. Switching or changing wireless access of wireless communication devices 110-112 among the various wireless frequency spectrums is in part controlled by the operations of wireless access node 120 and processing node 122, as discussed herein.

FIG. 2 is a flow diagram illustrating a method of operation of communication system 100. The numbered operations of FIG. 2 are referenced herein for convenience. In FIG. 2, wireless access node 120 provides (201) wireless access to communication services for wireless communication devices 110-112 over a first frequency spectrum. As discussed above, wireless communication devices 110-112 can receive wireless access over a first frequency spectrum, which is associated with wireless link 150 in this example. Although one wireless link for link 150 is shown for clarity, this is merely representative, and further wireless links may be shown for any of wireless communication devices 110-112.

Wireless access node 120 receives (202) tracking area updates 140 transferred by ones of wireless communication devices 110-112. The tracking area updates are received in this example over wireless link 150, and are typically transferred as a part of a registration process between wireless communication devices 110-112 and wireless access node 120. The tracking area updates, such as those shown in FIG. 1 as elements 140, can each include an indication from any of wireless communication devices 110-112 of a tracking area identifier. The tracking area updates can be transferred responsive to any of wireless communication devices 110-112 receiving the wireless access from wireless access node 120 and determining to be receiving the wireless access in a tracking area different than before.

A tracking area can refer to a geographic region defined by a quantity of wireless access nodes for delivery of various messages to wireless communication devices, such as pages, incoming call notifications, text message delivery, and the like. If a wireless communication device is in a first tracking area, an indication can be reported by the wireless communication device to a tracking node in the associated wireless communication system so that the various messages can be transferred properly to the wireless communication device. If the wireless communication device leaves the first tracking area, as detected during a registration process at a new wireless access node, then a new tracking area is typically reported to the tracking node in the associated wireless communication system to ensure proper delivery of the messages.

Processing node 122 processes (203) a quantity of the tracking area updates received at wireless access node 120 to determine idle timers for wireless communication devices 110-112. In this example, an expiration of an associated idle timer indicates that an associated wireless communication device can no longer receive wireless access over the first frequency spectrum, and can receive further wireless access over a second wireless frequency spectrum. The quantity of tracking area updates can indirectly indicate a loading of the first or second wireless frequency spectrums. An expiration of an idle timer can indicate when a wireless communication device associated with the particular idle timer can stay affiliated with a particular wireless frequency spectrum a particular wireless access node, among other associations. When the idle timer expires, the wireless communication device must seek wireless access from a different wireless access node or over a different wireless frequency spectrum. In some examples, the idle timers comprise subscriber profile identifier (SPID) timers.

FIG. 3 is a system diagram illustrating communication system 300. Communication system 300 includes user devices 310-313, E-UTRAN Node B or Evolved Node B equipment (eNodeB) 321-322, cellular network 320, and Mobility Management Entity (MME) 325. User devices 310-313 are each cellular smartphones in this example, but can instead be game devices, tablet computers, personal computers, and the like. User devices 310-313 and eNodeB 321 communicate over wireless link 330, which is a Long-Term Evolution (LTE) cellular wireless link provided over a first wireless frequency spectrum in this example. User devices 310-313 and eNodeB 322 communicate over wireless link 331, which is an LTE cellular wireless link provided over a second wireless frequency spectrum in this example. Each of eNodeB 321-322 is an example of a wireless access node in this example. eNodeB 321 and eNodeB 322 can be separate equipment or included in commonly shared wireless access node equipment. In some examples, a single eNodeB is employed and elements 321-322 represent different transceiver and antenna equipment for providing wireless access over the associated wireless frequency spectrum.

Each eNodeB 321-322 and cellular network 320 communicates over an associated optical network backhaul link 332-333. Cellular network 320 and MME 325 communicate over IP link 334. In operation, cellular network 320 and each eNodeB 321-322 provide wireless access to communication services for user devices 310-313. The communication services can include voice calls, messaging, data access, or other services. Cellular network 320 can include further eNodeB equipment or other base station equipment distributed over a geographic area to provide these communication services to user devices 310-313.

A detailed view of MME 325 is illustrated in FIG. 3. MME 325 can include equipment and systems as discussed herein for processing node 122 in FIG. 1, although variations are possible. MME 325 includes communication interface 326, processing system 327, and memory 328. In operation, processing system 327 is operatively linked to communication interfaces 326 and memory 327. Processing system 327 is capable of executing software stored in memory 327. When executing the software, processing system 327 drives MME 325 to operate as described herein. MME 325 can also include other elements, such as user interfaces, computer systems, databases, distributed storage and processing elements, and the like.

Processing system 327 may be implemented within a single processing device but may also be distributed across multiple processing devices or sub-systems that cooperate in executing program instructions. Examples of processing system 327 include general purpose central processing units, microprocessors, application specific processors, and logic devices, as well as any other type of processing device.

Communication interface 326 includes a network interface for communicating with cellular network 320. The network interface can include a local or wide area network communication interface which can communicate over an Ethernet or Internet protocol (IP) link. Examples of communication interface 326 include network interface card equipment, transceivers, modems, and other communication circuitry.

Memory 328 may comprise any storage media readable by processing system 327 and capable of storing software. Memory 328 may include volatile and nonvolatile, removable and non-removable media implemented in any method or technology for storage of information, such as computer readable instructions, data structures, program modules, or other data. Memory 328 may be implemented as a single storage device but may also be implemented across multiple storage devices or sub-systems. Memory 328 may comprise additional elements, such as a controller, capable of communicating with processing system 327. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in memory 328 may comprise computer program instructions, firmware, or some other form of machine-readable processing instructions having processes that when executed by processing system 327 direct MME 325 to operate as described herein. For example, software drives MME 325 to identify or determine a quantity of tracking area updates and process the quantity of tracking area updates to determine idle timers, among other operations. The software may also include user software applications. The software may be implemented as a single application or as multiple applications. In general, the software may, when loaded into processing system 327 and executed, transform processing system 327 from a general-purpose device into a special-purpose device customized as described herein.

MME 325 can be included in the equipment or systems of cellular network 320, or can be included in separate equipment or systems, including combinations thereof. Examples of MME 325 may also include software such as an operating system, logs, utilities, drivers, databases, data structures, networking software, and other software stored on a computer-readable medium.

Figure 4:
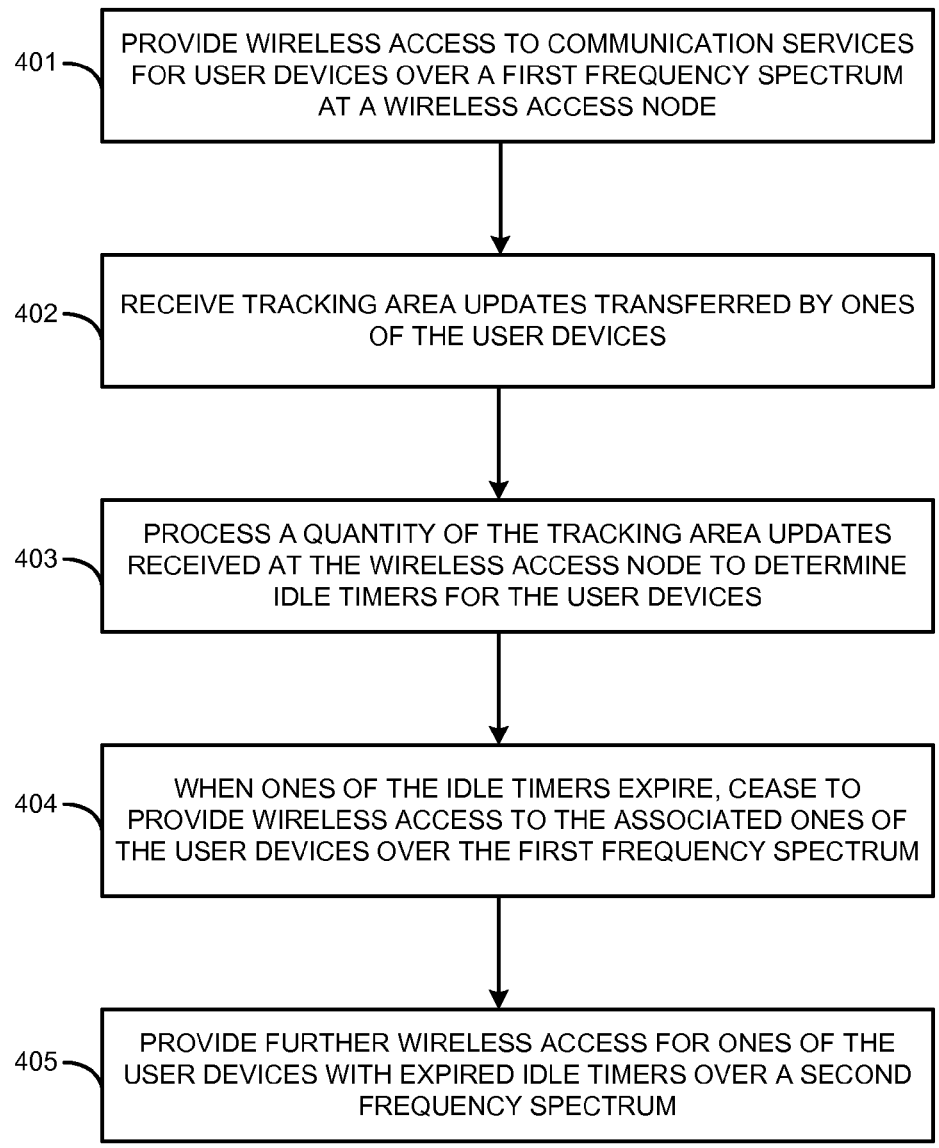
FIG. 4 is a flow diagram illustrating a method of operation of a communication system.

FIG. 4 is a flow diagram illustrating a method of operation of communication system 300. The numbered operations of FIG. 4 are referenced herein for convenience. In FIG. 4, eNodeB 321 provides (401) wireless access to communication services for ones of user devices 310-313 over a first frequency spectrum using wireless link 330. The communication services can include voice calls, data access, text messages, video calls, and data streams, among other communication services. As mentioned above, the first frequency spectrum comprises a first cellular frequency spectrum. eNodeB 322 provides wireless access to communication services for ones of user devices 310-313 over a second frequency spectrum using wireless link 331. As mentioned above, the second frequency spectrum comprises a second cellular frequency spectrum, which in this example is different than the first cellular frequency spectrum. For example, the first wireless frequency spectrum can be of a 2500 megahertz (MHz) frequency spectrum, while the second wireless frequency spectrum can be of the 1900 MHz frequency spectrum. Other frequencies can be employed, such as 700 MHz, 1700 MHz, 1800 MHz, 2400 MHz, among others, and the examples herein should not be interpreted as limited to a specific frequency spectrum or frequency band. Also, although LTE is discussed in this example, various wireless communication protocols and standards can be employed over each wireless link.

Over wireless link 330, eNodeB 321 receives (402) tracking area updates transferred by ones of user devices 310-313. Since wireless link 330 represents wireless access over a first frequency spectrum, the quantity of tracking area updates are likewise received over the first frequency spectrum in this example. The tracking area updates are typically transferred as a part of a registration process between user devices 310-313 and eNodeB 321. The tracking area updates, such as those shown in FIG. 3 as element 340, can each include an indication from any of user devices 310-313 of a tracking area identifier. The tracking area updates can be transferred responsive to any of user devices 310-313 receiving the wireless access from eNodeB 321 and determining to be receiving the wireless access in a new tracking area or a tracking area that is different than previously reported.

A tracking area can refer to a geographic region defined by a quantity of wireless access nodes for delivery of various messages to wireless communication devices, such as pages, incoming call notifications, text message delivery, and the like. If a user device is in a first tracking area, an indication can be reported by the user device to a tracking node in the associated wireless communication system so that the various messages can be transferred properly to the user device. If the user device leaves the first tracking area, as detected during a registration process at a new wireless access node, then a new tracking area is typically reported to the tracking node in the associated wireless communication system to ensure proper delivery of the messages.

MME 325 processes (403) a quantity of the tracking area updates received at the wireless access node to determine idle timers for user devices 310-313. The tracking area updates themselves, or an indication of the quantity of tracking area updates, received by eNodeB 321 are transferred by eNodeB 321 over at least links 332 and 334 for delivery to MME 325. MME 325 receives these tracking area updates or the indication of the quantity of tracking area updates for processing. In this example, processing the quantity of the tracking area updates received at the wireless access node to determine the idle timers for the wireless communication devices includes determining a first idle timer value when the quantity of tracking area updates falls below a first threshold and assigning the first idle timer value as the idle timers, and determining a second idle timer value when the quantity of tracking area updates exceeds the first threshold and assigning the second idle timer value as the idle timers. The quantity of tracking area updates can be an indirect indication of a level of traffic or a level of loading of a particular wireless frequency spectrum or band, as well as a particular eNodeB. When a quantity of tracking area updates received by eNodeB 321 is above a threshold, then the level of traffic on eNodeB 322 may be high, and the wireless communication system prefers user devices continue to receive wireless access from eNodeB 321 instead of switching to eNodeB 322 when an idle timer expires to prevent even higher levels of traffic on eNodeB 322. Likewise, when a quantity of tracking area updates received by eNodeB 321 is below a threshold, then the level of traffic on eNodeB 322 may be low, and the wireless communication system prefers user devices to switch to receiving wireless access from eNodeB 322 at a default or normal pace, as indicated by a lower idle timer.

As another example, the first idle timer value can be greater than the second idle timer value which indicates a longer idle time for associated user devices receiving wireless access from eNodeB 321 when the quantity of tracking area updates falls below the first threshold. Having a longer idle time when the quantity of tracking area updates falls below the first threshold can keep user devices 'camped' or idle on eNodeB 321 for a longer period of time, which can reduce the number of user devices seeking wireless access from eNodeB 322. Having a shortened idle time when the quantity of tracking area updates exceeds the first threshold can force user devices 'camped' or idle on eNodeB 321 to seek wireless access over wireless link 331 from eNodeB 322 instead of over wireless link 330 from eNodeB 321. Multiple thresholds can be employed, such as a first threshold for a first idle timer and a second threshold for a second idle timer, where the first threshold indicates a greater quantity of tracking area updates than the second threshold.

As a further example, MME 325, or other nodes associated with cellular network 320, identifies user profiles associated with the individual user devices. The user profiles can indicate a preferred wireless frequency spectrum, customer type, wireless service provider, cellular service company, or other information. These user profiles can be processed along with the quantity of the tracking area updates received at eNodeB 321 to determine the idle timers for the user devices. In some examples, where for user devices associated with a first wireless service provider, a first idle timer value is determined based on the quantity of the tracking area updates and being associated with the first wireless service provider, and for wireless communication devices associated with a second wireless service provider, a second idle timer value is determined based on the quantity of the tracking area updates and being associated with the second wireless service provider. Thus, user devices of registered for wireless service with a first cellular service company can have different idle timers as those registered for wireless service via a second cellular service company.

When ones of the idle timers expire, eNodeB 321 ceases (404) to provide wireless access to the associated ones of user devices 310-313 over the first frequency spectrum. In some examples, eNodeB 321 monitors the idle timers and responsively ceases to provide the wireless access to user devices with expired idle timers. In other examples, MME 325 monitors the idle timers and responsively instructs eNodeB 321 to cease providing the wireless access to user devices with expired idle timers. In yet further examples, the user devices themselves monitor an idle timer associated therewith, and halt wireless access over wireless link 330 upon expiration of the associated idle timer.

eNodeB 322 provides (405) further wireless access for ones of user devices 310-313 with expired idle timers over a second frequency spectrum. When a user device determines that the wireless access over wireless link 330 has ceased or has been halted, if further wireless access is desired, then the further wireless access is sought over wireless link 331 from eNodeB 322. Other eNodeB nodes or wireless access nodes can instead be selected by the associated user device, as affected by signal strength, signal conditions, wireless traffic conditions, or other considerations. However, in this example, eNodeB 322 provides the further wireless access over wireless link 331.

Referring back to FIG. 1, wireless communication devices 110-112 each comprise one or more transceiver circuitry elements and communication elements. The transceiver circuitry typically includes amplifiers, filters, modulators, and signal processing circuitry. Wireless communication devices 110-112 can also each include user interface systems, memory devices, non-transitory computer-readable storage mediums, software, processing circuitry, or some other communication components. Wireless communication devices 110-112 can each be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Wireless access node 120 is associated with communication network 121, and provides wireless links for wireless access to the communication services of communication network 120. Wireless access node 120 comprises RF communication and control circuitry, transceivers, and antennas, as well as wireless communications equipment capable of communicating with and providing wireless access within a wireless coverage area to communication services for wireless communication devices, such as wireless communication devices 110-112. The RF communication circuitry typically includes amplifiers, filters, RF modulators, transceivers, and signal processing circuitry. Wireless access node 120 may also comprise elements such as base stations, base transceiver stations (BTS), E-UTRAN Node B equipment, eNodeB equipment, Evolved Node B equipment, Evolved Universal Terrestrial Radio Access (E-UTRA) network equipment. In the example shown in FIG. 1, wireless access node 120 includes equipment to provide wireless access over more than one wireless frequency spectrum, which may include on or more transceivers, antennas, processing systems, or other equipment.

Communication network 121 comprises communication and control systems for providing access to communication services for user devices. Communication network 121 can provide communication services including voice calls, text messages, data access, or other communication services provided over a cellular or wireless communication network. In some examples, wireless communication network 120 includes equipment to provide wireless access to communication services within different coverage areas to user devices, route communications between content providers and user devices, and facilitate handoffs between equipment of different coverage areas, among other operations. Communication network 121 may also comprise elements such as E-UTRAN Node B equipment, eNodeB equipment, Evolved Node B equipment, Mobility Management Entity (MME) equipment, Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Processing node 122 comprises systems and equipment for determining a quantity of tracking area updates and determining idle timers based on the quantity of tracking area updates, among other operations. Processing node 122 can include communication or network interfaces, as well as computer systems, microprocessors, circuitry, or some other processing devices or software systems, and may be distributed among multiple processing devices. Examples of processing node 122 may also include software such as an operating system, logs, databases, utilities, drivers, networking software, and other software stored on a computer-readable medium. Processing node 122 can also include Mobility Management Entity (MME) equipment, mobile switching centers (MSC), cloud-based systems, database systems, authentication systems, or other systems.

Communication links 152-153 each use metal, glass, optical, air, space, or some other material as the transport media. Communication links 152-153 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 152-153 can each be a direct link or may include intermediate networks, systems, or devices, and can include a logical network link transported over multiple physical links.

Wireless links 150-151 can each use the air or space as the transport media. Wireless link 150-151 each comprises a wireless communication link provided over an associated wireless frequency spectrum or wireless frequency band, and may use various protocols, such as Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main wireless link for each of wireless links 150-151 is shown in FIG. 1, it should be understood that wireless links 150-151 are merely illustrative to show communication modes or wireless access pathways for wireless communication devices 110-112. In other examples, further wireless links can be shown, with portions of the further wireless links shared and used for different communication sessions or different content types, among other configurations.

Communication links 150-153 may each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a communication system, the method comprising:
   providing wireless access to communication services for wireless communication devices over a first frequency spectrum at a wireless access node;
   receiving tracking area updates transferred by ones of the wireless communication devices;
   identifying a quantity of the tracking area updates received at the wireless access node from the ones of the wireless communication devices;
   processing at least the quantity of the tracking area updates to determine idle timers for the wireless communication devices, wherein an expiration of an associated idle timer indicates that an associated wireless communication device can no longer receive the wireless access over the first frequency spectrum and can receive further wireless access over a second frequency spectrum.

2. The method of claim 1, wherein the expiration of the associated idle timer further instructs the wireless access node to cease providing the wireless access to the associated wireless communication device over the first frequency spectrum.

3. The method of claim 1, wherein the tracking area updates each comprise an indication from any of the wireless communication devices responsive to receiving the wireless access and determining to be receiving the wireless access in a tracking area different than a previous wireless access.

4. The method of claim 1, further comprising:
   identifying user profiles for the wireless communication devices;
   processing the user profiles and the quantity of the tracking area updates received at the wireless access node to determine the idle timers for the wireless communication devices.

5. The method of claim 4, wherein the user profiles indicate a wireless service provider for each of the wireless communication devices; and
   wherein for wireless communication devices associated with a first wireless service provider, a first idle timer value is determined based on the quantity of the tracking area updates and the first wireless service provider, and for wireless communication devices associated with a second wireless service provider, a second idle timer value is determined based on the quantity of the tracking area updates and the second wireless service provider.

6. The method of claim 1, wherein the quantity of tracking area updates are received over the first frequency spectrum, and wherein processing the quantity of the tracking area updates received at the wireless access node to determine the idle timers for the wireless communication devices comprises:
   determining a first idle timer value when the quantity of tracking area updates falls below a first threshold and assigning the first idle timer value as the idle timers; and
   determining a second idle timer value when the quantity of tracking area updates exceeds the first threshold and assigning the second idle timer value as the idle timers.

7. The method of claim 6, wherein the first idle timer value is greater than the second idle timer value.

8. The method of claim 1, wherein the first frequency spectrum comprises a first cellular frequency spectrum and the second frequency spectrum comprises a second cellular frequency spectrum different than the first cellular frequency spectrum.

9. The method of claim 1, wherein the wireless access node comprises a first Long Term Evolution (LTE) eNodeB which provides the wireless access over the first frequency spectrum comprising a first LTE cellular frequency spectrum and a second LTE eNodeB which provides the further wireless access over the second frequency spectrum comprising a second LTE cellular frequency spectrum.

10. The method of claim 1, wherein the idle timers comprise subscriber profile identifier (SPID) timers.

11. A communication system, comprising:
   a wireless access node configured to provide wireless access to communication services for wireless communication devices over a first frequency spectrum, and receive tracking area updates transferred by ones of the wireless communication devices;
   a processing node configured to identify a quantity of the tracking area updates received at the wireless access node from the ones of the wireless communication devices;
   the processing node configured to process at least a quantity of the tracking area updates to determine idle timers for the wireless communication devices, wherein an expiration of an associated idle timer indicates that an associated wireless communication device can no longer receive the wireless access over the first frequency spectrum and can receive further wireless access over a second frequency spectrum.

12. The communication system of claim 11, wherein the expiration of the associated idle timer further instructs the wireless access node to cease providing the wireless access to the associated wireless communication device over the first frequency spectrum.

13. The communication system of claim 11, wherein the tracking area updates each comprise an indication from any of the wireless communication devices responsive to receiving the wireless access and determining to be receiving the wireless access in a tracking area different than a previous wireless access.

14. The communication system of claim 11, comprising:
the processing node configured to identify user profiles for the wireless communication devices and process the user profiles and the quantity of the tracking area updates received at the wireless access node to determine the idle timers for the wireless communication devices.

15. The communication system of claim 14, wherein the user profiles indicate a wireless service provider for each of the wireless communication devices; and
wherein for wireless communication devices associated with a first wireless service provider, the processing node is configured to determine a first idle timer value based on the quantity of the tracking area updates and the first wireless service provider, and for wireless communication devices associated with a second wireless service provider, the processing node is configured to determine a second idle timer value based on the quantity of the tracking area updates and the second wireless service provider.

16. The communication system of claim 11, wherein the quantity of tracking area updates are received over the first frequency spectrum; and
wherein the processing node is configured to determine a first idle timer value when the quantity of tracking area updates falls below a first threshold and assign the first idle timer value as the idle timers; and
wherein the processing node is configured to determine a second idle timer value when the quantity of tracking area updates exceeds the first threshold and assign the second idle timer value as the idle timers.

17. The communication system of claim 16, wherein the first idle timer value is greater than the second idle timer value.

18. The communication system of claim 11, wherein the first frequency spectrum comprises a first cellular frequency spectrum and the second frequency spectrum comprises a second cellular frequency spectrum different than the first cellular frequency spectrum.

19. The communication system of claim 11, wherein the wireless access node comprises a first Long Term Evolution (LTE) eNodeB which provides the wireless access over the first frequency spectrum comprising a first LTE cellular frequency spectrum and a second LTE eNodeB which provides the further wireless access over the second frequency spectrum comprising a second LTE cellular frequency spectrum.

20. The communication system of claim 11, wherein the idle timers comprise subscriber profile identifier (SPID) timers.

* * * * *